United States Patent [19]
Furuya et al.

[11] Patent Number: 4,722,082
[45] Date of Patent: Jan. 26, 1988

[54] ISDN SUBSCRIBER TERMINAL CONTROL SYSTEM

[75] Inventors: Nobuo Furuya; Yoshikazu Ikeda; Masanobu Fujioka, all of Tokyo, Japan

[73] Assignee: Kokusai Denshin Denwa Co., Ltd., Tokyo, Japan

[21] Appl. No.: 835,716

[22] Filed: Mar. 3, 1986

[30] Foreign Application Priority Data

Mar. 4, 1985 [JP] Japan .................................. 60-41184

[51] Int. Cl.$^4$ ............................ H08J 3/02; H08J 3/12
[52] U.S. Cl. .................................. 370/85; 370/110.1; 340/825.5
[58] Field of Search ............... 370/85, 89, 58, 110.1, 370/99; 380/825.5

[56] References Cited
U.S. PATENT DOCUMENTS 4,581,733 4/1986 Sarson et al. ......................... 370/85
4,592,047 5/1986 Fundneider ........................... 370/85

OTHER PUBLICATIONS

CCITT I-400, Integrated Services Digital Network.

Primary Examiner—Douglas W. Olms
Assistant Examiner—Frank M. Scutch, III
Attorney, Agent, or Firm—Armstrong, Nikaido, Marmelstein & Kubovcik

[57] ABSTRACT

The ISDN user-network interface is defined in the CCITT D-channel protocol recommendation (I-400 series recommendations), in which many kinds of communication terminals (e.g. fáximile, telephone, teletex, etc.) can communicate through a subscriber line. The user-network interface is improved from the view point of effectiveness of terminal usage, provision of communication service, and, flexibility of system configuration, by providing a control terminal in the subscriber. The control terminal doubles as ordinary terminal equipment, and has a global control function for controlling other subscriber terminal equipment. The control terminal establishes and/or releases a local control phase in which a control terminal controls ordinary terminal equipment in the same subscriber to have them correspond to the communication with another subscriber using the means which belong to the ordinary terminal equipment inherently. The control terminal operates as an ordinary terminal apparatus when it is not in local control phase.

6 Claims, 8 Drawing Figures

ISDN SUBSCRIBER TERMINAL CONTROL SYSTEM

BACKGROUND OF THE INVENTION

The present invention relates to an improvement of an ISDN user-network interface which implements various kinds of communication including a circuit switching type communication, and/or a packet type communicaton between a communication network and various kinds of terminal apparatuses installed in a subscriber through a subscriber line.

Figure 1:
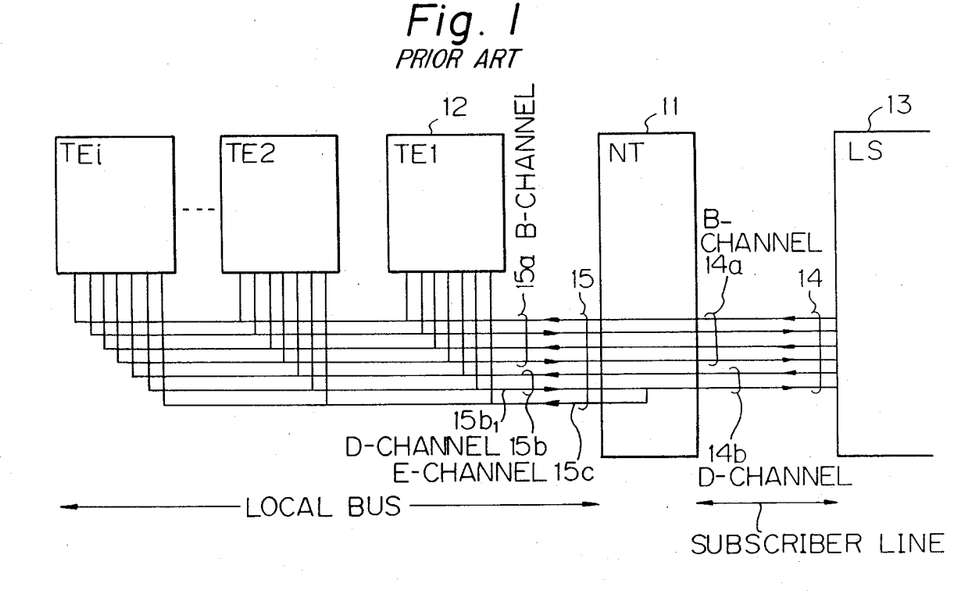
FIG. 1 is a block diagram of user-network interface defined by D-channel protocol which is recommended by CCITT in 1984.

FIG. 1 shows a block diagram of a user-network interface defined by the D-channel protocol (I-400 series recommendations) recommended by CCITT in 1984. In the figure, the symbol NT(11) is a network termination unit which terminates both a subscriber line and a subscriber local bus, and coupling the same with each other, $TE_1$, $TE_2$... $TE_i$ (12) are terminal equipment LS(13) is a subscriber line exchange system. A subscriber line 14 is provided between the exchange system LS and the termination unit NT. The line 14 comprises two B-channels 14a in which bothway communication signals are transmitted, and a D-channel 14b in which a call control signal and packet type communication signals are transmitted. Each terminal equipment $TE_i$ is coupled with the subscriber local bus 15 which is terminated by the termination unit NT. Two B channels 15a and a D-channel 15b in a subscriber local bus are provided between the termination unit NT and the terminal apparatuses TE. Further, an echo channel (called E-channel) in the direction from the termination unit NT to the terminal apparatuses TE is provided in a subscriber local bus so that the D-channel signal from the terminal equipment TE to the termination unit NT is offset by the termination nation unit NT to the echo channel. The E channel is used to prevent an access collision by more than two terminal equipment, that is to say, each terminal equipment $TE_i$ monitors the echo channel, and when the terminal equipment $TE_i$ finds that the D-channel from the terminal equipment $TE_i$ to the termination unit NT $15_{b1}$ is available, the terminal equipment $TE_i$ sends a signal to that D-channel $15_{b1}$. As the signal on the D-channel $15_{b1}$ is offset in the termination unit NT, and appears in the echo line, the terminal equipment $TE_i$ tests if the signal on the echo line is the same as the signal which the terminal equipment $TE_i$ itself sent to the D-channel $15_{b1}$. When those signals differ from each other, the terminal equipment $TE_i$ stops sending a signal.

A signal is sent in a frame which has a flag, address part, control part for recognizing what kind of frame it is, information part, and frame check sequence part for error detection. The address part consists of a service access point identifier (SAPI) which shows the kind of service (for instance, transfer of call control signal, or transmission of packet type communication signal), and terminal endpoint identifier (TEI). When a frame which has a call control signal, and/or packet type communication signal is transmitted to the D-channel, it is acknowledged that the signal sent is received correctly in the exchange system LS for every frame, or for more than one frame. Another method for signal transfer is provided in which no information acknowledgement is carried. This method is mainly used for a local signal. The information for indicating whether or not the acknowledgement is sent, is included in the control part of a frame.

However, according to the D-channel protocol recommended in 1984, there is the disadvantage that a communication among terminal equipment in a subscriber is not possible, although communication between a terminal equipment in a subscriber and the end terminal equipment in another subscriber or an information processing unit which locates in a communication network is possible.

Further, there is the disadvantage that it is impossible to switch a signal between terminal equipments without losing a reception signal from far end of the communication line. Thus, the system of FIG. 1 has the disadvantage that it can not use various kinds of terminal apparatuses effectively.

Further, there is the disadvantage that terminal equipment in a subscriber just communicates with terminal equipment in another subscriber independently of the terminal equipment in the same subscriber and that several terminal equipment in the same subscriber can not correspond a communication with other subscribers cooperatively.

Thus, each function provided by several of the terminal equipment in the same subscriber can not be used effectively.

SUMMARY OF THE INVENTION

It is an object, therefore, of the present invention to overcome the disadvantages and limitations of a prior ISDN user-network interface by providing a new and improved ISDN subscriber terminal control system.

It is also an object of the present invention to provide an ISDN subscriber terminal control system which may communicate with local terminals.

The above and other objects are attained by an ISDN subscriber terminal control system comprising a subscriber line coupled with a subscriber, a local bus installed in the subscriber and, a network termination unit for terminating both the subscriber line and the local bus and connecting them. A plurality of terminal equipment is coupled with the local bus. A plurality of two way communication channels is provided so that any terminal equipment can communicate with a terminal equipment in another subscriber. One of the communication channels is a control channel. Another one of the communication channels is an echo channel which sends a copy of a control channel signal from the terminal equipment to the network termination unit. The echo channel is from the network termination channel to the terminal equipment. A control terminal which is one of the plurality of terminal equipment, having global control and communication parts, is provided in a subscriber. The control terminal communicates with the terminal equipment within a subscriber without sending any significant signal to a subscriber line which is physically coupled with the local bus. The control terminal establishes/releases a local control phase and cooperatively the ordinary terminal equipment concerned with the communication with another subscriber by the transference of a terminal control signal between a control terminal and the ordinary terminal equipment and the use of the means which belongs to the ordinary terminal equipment inherently. The control terminal operates as an ordinary terminal equipment when it is not in a local control phase.

BRIEF DESCRIPTION OF THE DRAWINGS

The foregoing and other objects, features, and attendant advantages of the present invention will be appreciated as the same becomes better understood by means of the following description and accompanying drawings wherein.

DESCRIPTION OF THE PREFERRED EMBODIMENTS

Figure 2:
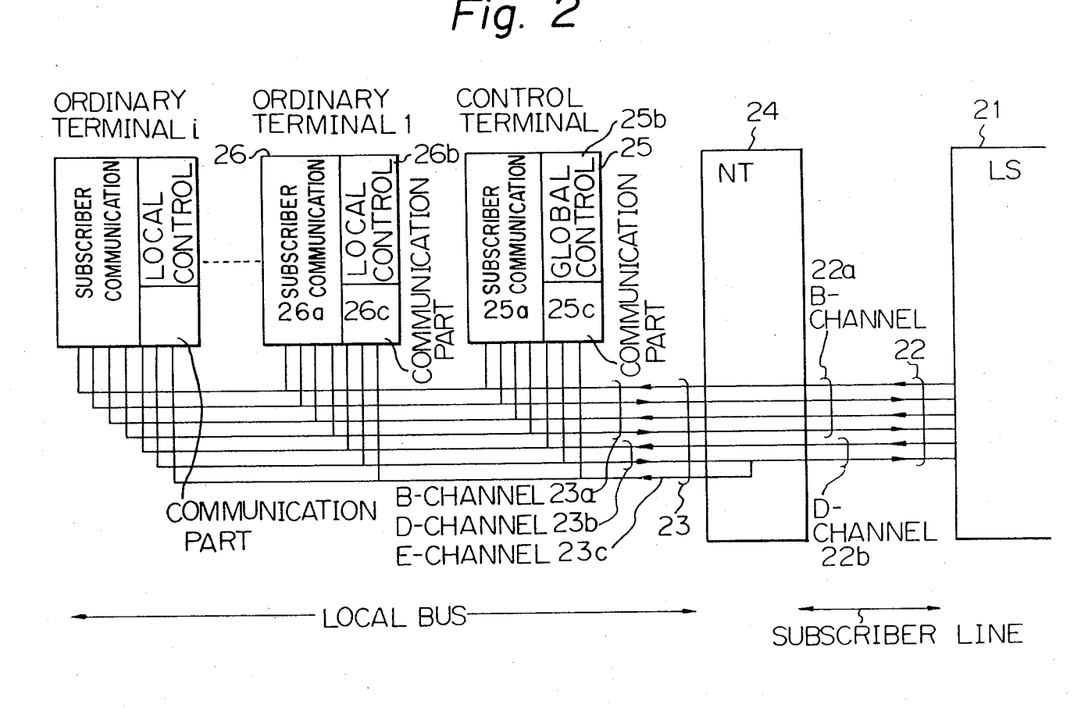
FIG. 2 is a brief block diagram of subscriber terminal equipment according to the present invention.

FIG. 2 shows a block diagram of the present invention. In the figure, the numeral 21 is a subscriber exchange. A subscriber line 22 has a pair of B-channels 22a for communication signal with another subscriber, and a single D-channel for call control signal and a packet type communication signal. The numeral 23 is a local bus which has a pair of B-channels 23a, a single D-channel 23b, and an E-channel 23c which transfers the signal from NT to TE which is same as the signal on D-channel from TE to NT. The numeral 24 is a network termination unit NT which terminates both the local bus 23 and the subscriber line 22, and couple them with each other. The numeral 25 is a control terminal equipment which is coupled with the local bus, and the numeral 26 is an ordinary terminal equipment.

The control terminal 25 has not only means 25a for the communication with the terminal equipment in another subscriber by sending/receiving communication signal through the B-channel and sending/receiving a call control signal and/or packet type communication signal through the D-channel, but also means 25b called a global control for controlling ordinary terminal equipment coupled with a local bus, and means 25c called communicaiton part for transference of information for controlling ordinary terminal equipments without affecting a network, without installing a specific communication line, by using communication means between terminal equipment. An ordinary terminal equipment 26 has means 26a for the communication with the terminal equipment in another subscriber by sending/receiving communication signal through the B-channel and sending/receiving a call circuit control signal and/or packet type communication signal through the D-channel, and means 26c (communication part) for transference of terminal control signal for controlling ordinary terminal equipment without affecting a network, without installing a specific communication line, by using communication means between terminal equipment, and means 26b called local control for controlling the terminal equipment 26 itself based upon the local control means 26b.

A local control phase is established for providing a control system when the control of the terminal equipment is required. A local control phase is released when the control of the terminal equipment is no longer required. When a call control phase is released, the control terminal and ordinary terminal equipment operate as an ordinary ISDN subscriber terminal. Thus, the system structure of the present invention is flexible.

The control phase is established or released as follows.

First, a control terminal sends a terminal command which instructs all the ordinary terminal equipment to follow the control terminal through the local bus simultaneously. Upon receipt of that command, an ordinary terminal sends to the control terminal a response which has information showing an attribute (telephone, facsimile, or data terminal et al). Then, the control terminal recognizes the ordinary terminal equipments which are under control of the control terminal. Thus, the control phase between the control terminal and the ordinary terminal equipment is established. Then, the control terminal sends a terminal control signal to the ordinary terminal equipment to control the ordinary terminal equipment.

When the local control phase is released, so that the ordinary terminal equipments are released from the control of the control terminal, the control terminal sends another command which instructs the ordinary terminal equipment to operate without control of the control terminal. Upon receipt of that command, an ordinary terminal equipment sends the control terminal a response which confirms operation without control by the control terminal. Then, the local phase is released, and the ordinary terminal equipment and the control terminal operate independently.

There are two control methods in which a control terminal controls the ordinary terminal equipments in the local control phase.

(Method 1); The control the control terminal is performed by the terminal control signals which are the commands from the control terminal and the responses by an ordinary terminal for these command. These commands have ordinary terminal equipment set up, release, suspend or resume a call or so on, as if the ordinary terminal equipment is instructed by an operator who depresses a start switch, and/or inputs a subscriber number for the communication. Upon receipt of the commands, an ordinary terminal equipment operates using all the means which is realized by layer 1, 2 and 3 functions of an ordinary ISDN terminal equipment. In the method 1, even in a local control phase, the equipment operates as an ordinary ISDN terminal equipment and is just controls the ordinary terminal inherently. Thus the control procedure is simple.

(Method 2); In addition to the functions for control of terminal equipments, a control terminal performs the layer 3 function of each terminal equipment by handling of call control signals of each terminal equipment. As the control equipment handles the call control signals of the ordinary terminal equipment, the terminal control signal between the control terminal and the ordinary terminal equipment is only the start/stop command and response for the transference of communication signal of each terminal equipment on the B-channel and/or the D-channel. In this control method, the control terminal can recognize the detailed communication state of the ordinary terminal equipment.

The embodiment of the present invention is now described.

The communication between terminal apparatuses is first described.

It has been known that not only a call control signal and a packet type communication signal, but also a communication signal between terminals are sent on a D-channel from a terminal equipment TE to a termination unit NT, and a reflection signal offset by the NT is received by the terminal from an E-channel, so that a communication between terminals is established without installing a specific communication line which differs from a local bus. However, in a prior system, signals between terminals on the D-channel leaks to the subscriber line and reaches the subscriber exchange LS. Therefore, the particular protection is required so that the local communication signal does not disturb the operation of the LS. Also, since the address information (TEI: terminal endpoint identifier) of a frame from the TE to the LS represents that the frame is transmitted from the terminal equipment which has this TEI in order to send a frame to the terminal in the same subscriber, TEI must be changed to that of the destination terminal equipment so that the reception side can recognize the signal to be received. In the D-channel protocol recommended in 1984, when a signal is received by an unnumbered information frame at the LS, the frame having SAPI which is not registered in the LS are disregarded without giving any effect to the LS. That protocol is provided so that an error frame and/or an unnecessary frame does not disturb the correct operation of an LS and a TE. The present invention uses that protocol, so that a signal between terminal equipment in a same subscriber does not reach the LS. Further, in order to set the TEI into the frame which will be received at another terminal in the same subscriber, and decide whether the frame should be received or not, the following procedure is taken.

When a signal is sent to a terminal in the same subscriber, the signal is sent to the D-channel by using an unnumbered information frame, having the SAPI which is not registered in the LS and is defined in the subscriber for the communication among terminal equipment in the same subscriber, and TEI of a called terminal (when a signal is sent to all the terminals simultaneously, the value of TEI is 127).

In order to receive the signal between terminal equipment in the same subscriber, a signal on the E-channel is first received. When the received signal has the SAPI which is not registered in the LS but is defined for the communication among terminal equipment in the same subscriber and the TEI which is the same as its own terminal, or TEI=127, and the signal is transferred by an unnumbered information frame, the received signal is taken into the terminal apparatus.

Figure 3:
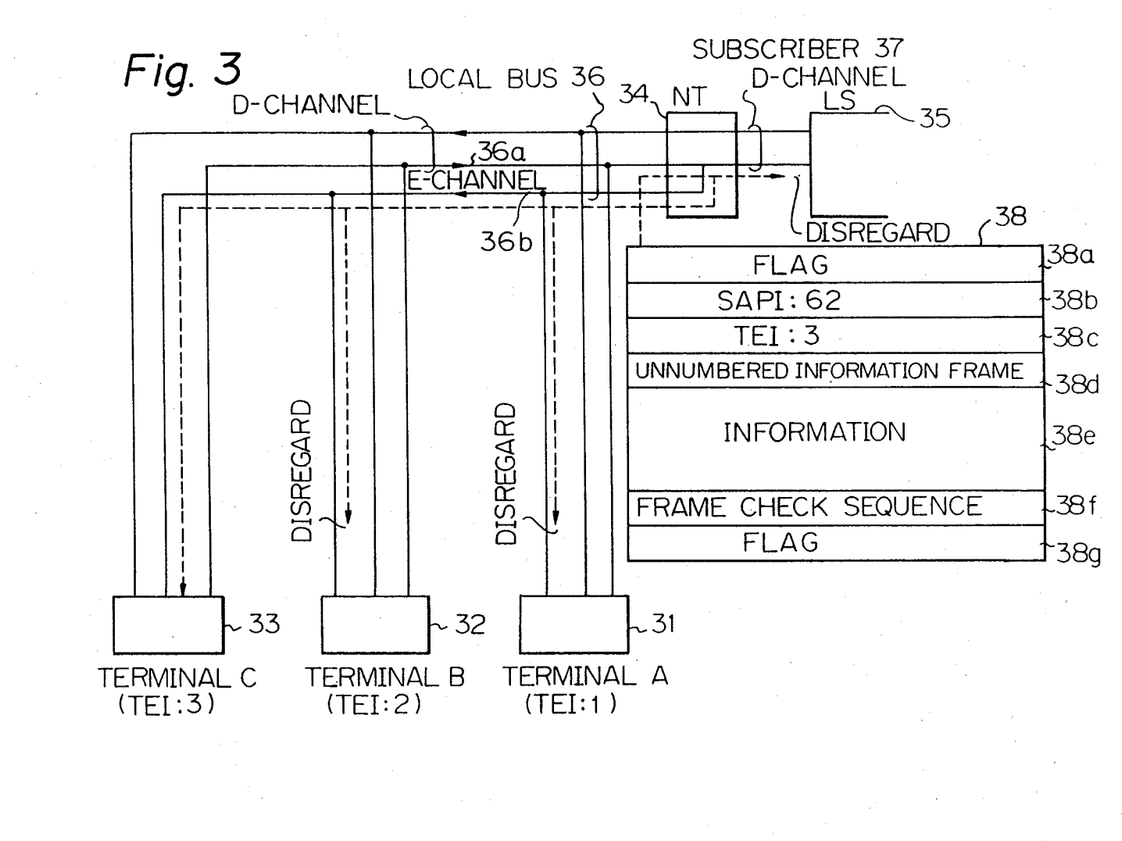
FIG. 3 shows structure for implementing communications between subscriber terminal equipment according to the present invention.

FIG. 3 shows the above examples. The B-channel is omitted in FIG. 3 for simplicity. In FIG. 3, the ISDN user-network interface has the terminal equipment A;31, B;32, and C;33 (TEI;1, TEI;2 and TEI;3), the termination unit NT;34, the LS;35 (subscriber exchange) which has the SAPI for a call control signal transfer (0) and for a packet type communication signal transfer (16), the local bus 36, the subscriber line 37, and the SAPI;62 for the communication among terminal equipments in the same subscriber. It is supposed that the terminal A;31 sends the terminal C;33 a signal.

The terminal A;31 sends to the D-channel from the TE to the LS, a frame which has a flag 38a, the code SAPI (=62) 38b which shows the communication among terminal equipments in the same subscriber, the code TEI (=3) 38c which is address information of the destination terminal equipment, a control field value 38d which shows the unnumbered information frame, an information 38e which is the signal transferred, a frame check sequence part 38f, and a flag 38g. That frame reaches the LS;35 through the subscriber line, and simultaneously, that frame is offset in the NT;34, and appears at the terminals A;31, B;32 and C;33 through the E-channel. Since the frame has the SAPI=62 which is not registered in the LS and is an unnumbered information frame, the LS;35 merely disregards the frame. Each terminal checks the SAPI;38b and TEI;38c, and since the SAPI is 62 which shows the communication among terminal equipment in the same subscriber, and TEI is 3, the terminal C;33 takes the frame, and other terminals disregard the frame. Therefore, the frame from the terminal A is received by the terminal C.

Figure 4A:
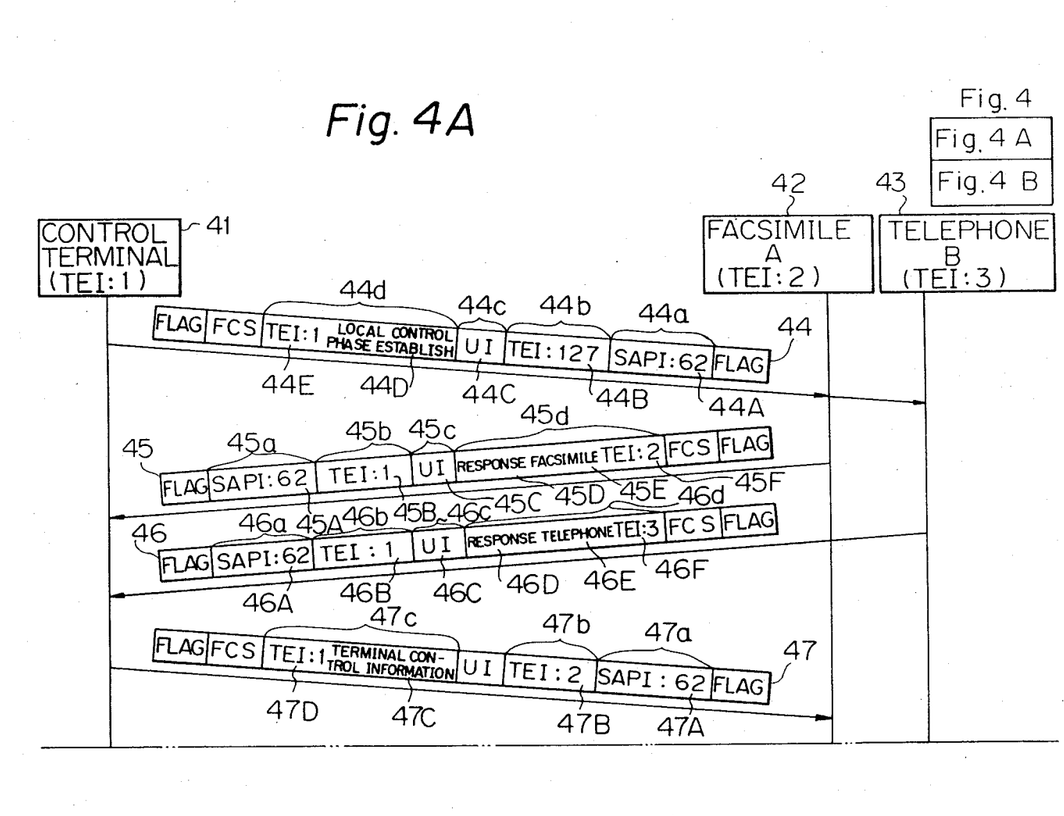
FIGS. 4a & 4b show a timing sequence between a control terminal and an ordinary terminal for establishing and/or releasing a local control phase.
Figure 4B:
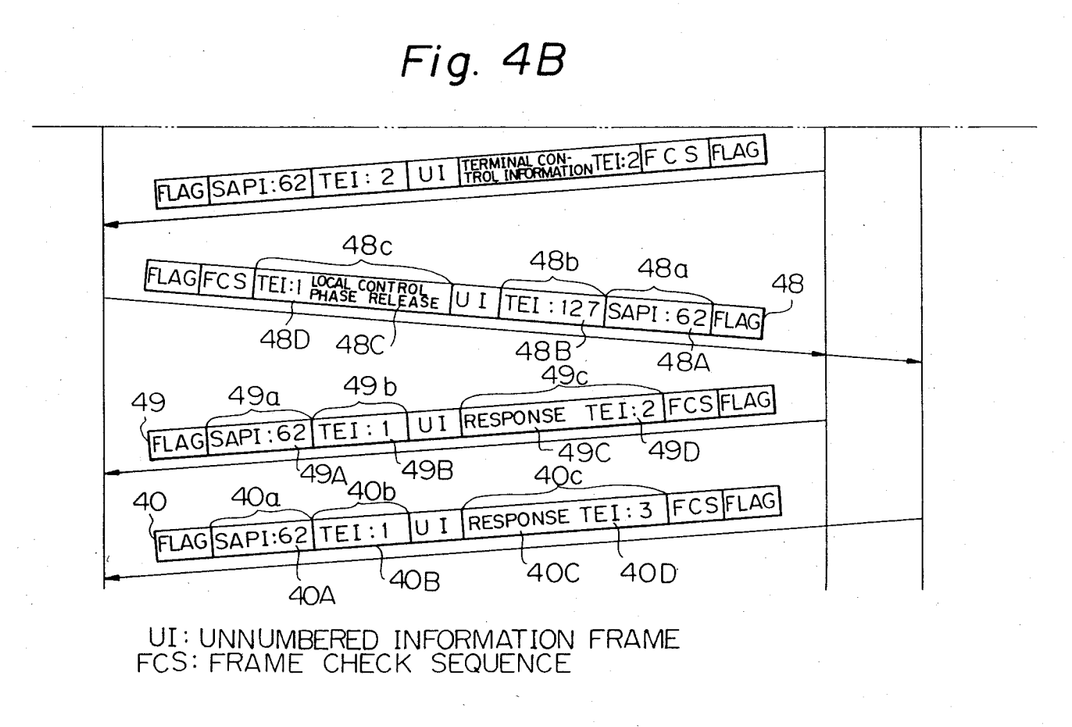

FIG. 4 shows a timing sequence between a control terminal and an ordinary terminal for establishing and/or releasing a local control phase. In the embodiment, a control terminal 41 having TEI=1, a facsimile terminal A;42 having TEI=2, and a telephone set B;43 having TEI=3 are coupled with a local bus. It is assumed that a frame includes the sender's address in the information part, since the protocol does not have the sender's address in a frame.

A control terminal which is coupled with a local bus sends a frame 44 which has code 44A which represents the communication among terminal equipment in the same subscriber in the SAPI;62, the destination address 44B which is 127 for designating all the other terminals in the TEI;44b, the control part 44c in which use of an unnumbered information frame is represented 44C, and information part 44d which represents the local phase start command 44D and the sender's TEI (44E=1). Upon receipt of that frame, each terminals send frames 45 and 46 in which codes 45A, 46A are inserted in the SAPI;62, a code 1 (45B, 46B) for the control terminal is inserted in the TEI;45b, 46b, a unnumbered information frame codes 45C and 46C is inserted in the control parts 45c and 46c. The information parts 45d and 46d have the responses 45D and 46D which show the response for the instruction of the local control phase, a code showing attribute of a terminal (facsimile=45E, and telephone=46E in the embodiment), and a sender's TEI (2;45F, and 3;46F). Thus, the control terminal recognizes the ordinary terminals which are ready to be controlled by the control terminal. Thus, the local control phase between the control terminal and the ordinary terminals is established.

Then, the control information is transferred between the control terminal and the ordinary terminals. For instance, when the control terminal 41 sends a terminal control signal to the facsimile terminal A;42, a frame which has 62;47A in the SAPI;47a, 2;47B in the TEI;47b, and the control information 47C and 1;47D of the sender's TEI in the information part 47c is sent out.

On the other hand, when the local control phase is released, a frame 48 which has 62;48A in the SAPI;48a, 127;48B designating all the terminals in the TEI;48b, the information 48C showing the release of the local control phase, and sender's TEI 1;48D in the information part 48c, is sent out. Upon receipt of that frame 48, each ordinary terminals send the frames 49, 40 in which code 62;49A, 40A are inserted in the SAPI;49a, 40a, 1;49B and 40B are inserted in the TEI;49b, and 40b, the response information 49C and 40C, and sender's TEI (2;49D, 3;40D) are inserted in the information part 49c, 40c as the response for the release command.

The manner that the control terminal controls ordinary terminals in the local control phase is now described.

Figure 5:
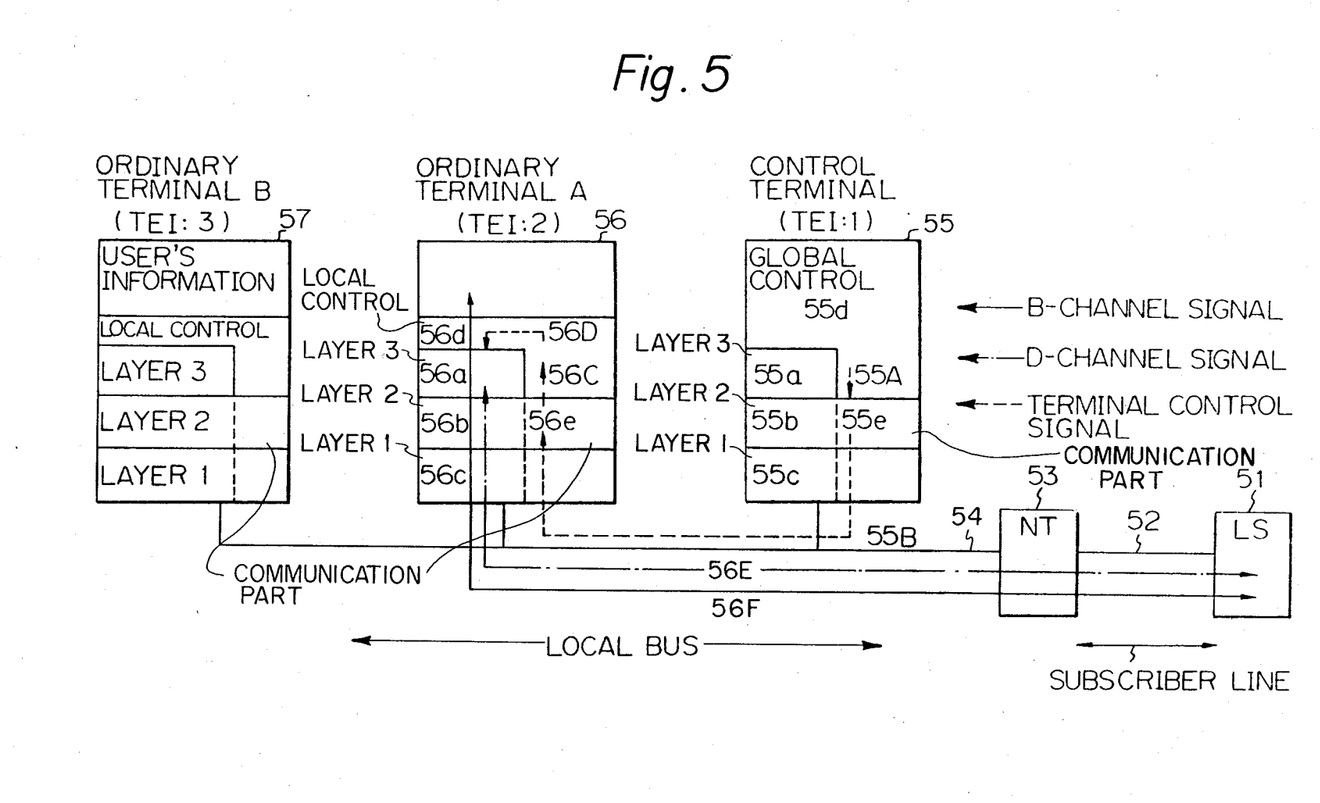
FIG. 5 and FIG. 6 are explanatory drawings showing how a control terminal controls an ordinary terminal in a local control phase.

(Method 1);

FIG. 5 shows the present case. For the sake of the simplicity of the drawing, a pair of B-channels, D-channel, E-channel on a local bus, and a pair of B-channels and a D-channel on a subscriber line are shown by a single solid line, respectively. Although signals among terminal equipment are transferred via NT, such description is omitted. In the embodiment, the system comprises a subscriber exchange LS;51, a subscriber line 52, a network termination unit NT;53, a local bus 54, a control terminal 55 coupled with the local bus, and ordinary terminal equipments A;56 and B;57.

The control terminal 55 has a layer 3 (55a) for establishing and/or releasing a call and/or acknowledging transfer of a packet type communication signal upon receipt of start/stop command from a user. A layer 2 (55b) has a part for receiving a call control signal and/or a packet type communication signal from the layer 3 and sending the same, and another part for composing a frame which has a header including an address and check bits, and decomposing the frame to transfer a decomposed information to the layer 3. A layer 1 (55c) controls of the conflict which occurs when more than one terminal equipment sends the signal to the D-channel, and transfers signals between the layer 2 and a local bus. A global control 55d controls all ordinary terminals coupled with a subscriber local bus. A communication part 55e transfers a terminal control signal using the layers 1 and 2.

An ordinary terminal has not only the layers 1 through 3 (56a, 56b, 56c), but also a communication part 56e for transferring a terminal control signal using the layers 1 and 2, and a local control 56d for controlling its own terminal based upon the terminal control signal.

It is assumed that the control terminal has the ordinary terminal A originate a call. The global control 55d of the control terminal send the communication part 55e a terminal control signal 55A which instructs the origination of a call. The communication part 55e, upon receipt of the terminal control signal 55A, makes a frame 55B which has the address of the terminal A, using the means 55b of the layer 2, and sends to the local bus 54 the frame by using the layer 1 (55c). In the ordinary terminal A(56), the communication part 56e receives the frame 55B from the local bus 54 by using the layer 1(56c), and sends the local control 56d the terminal control signal 56C which instructs the start of a call after taking the same in the frame 55B by using the layer 2(56b). The local control 56d interpretes the terminal control signal which instructs the start of a call, and instructs the layer 3(56a) to establish a call (56D). Then, after transmit and receive of a call control signal 56E, and completion of start of a call, an ordinary terminal A(56) sends/ receives communication signal 56F through the B-channel.

Figure 6:
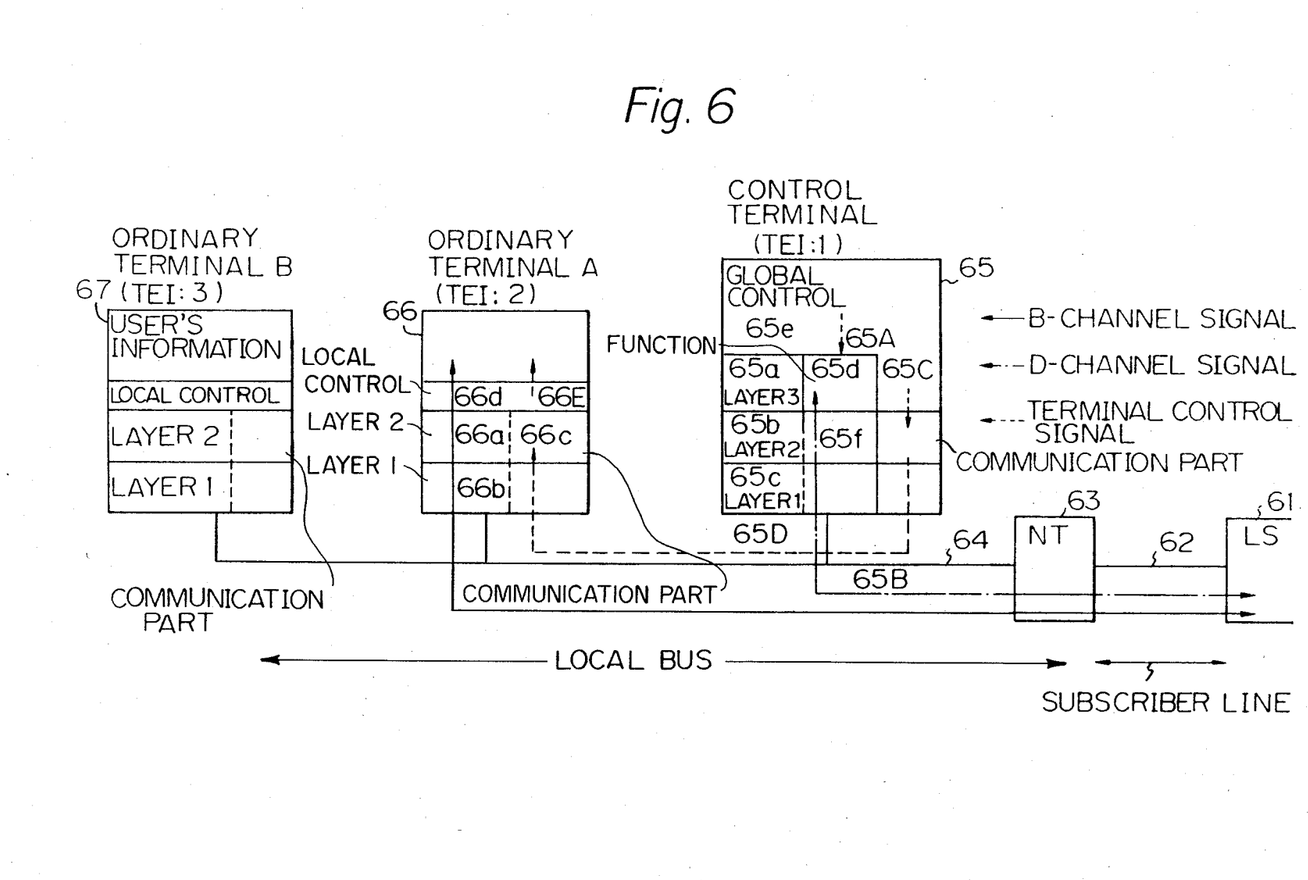

(Method 2);

FIG. 6 shows the explanation of the method 2. In FIG. 6, a pair of B-channels, D-channel, and E-channel on the local bus on a local bus, and a pair of B-channels, and D-channel on the subscriber line are indicated by single solid lines, respectively. Further, although the signal between terminals is transmitted through the NT, it is shown as if the signal is transmitted directly without using the NT for the sake of the simplicity of the drawing. In FIG. 6, the system comprises a subscriber exchange (LS) 61, a subscriber line 62, a network termination unit (NT) 63, a local bus 64, a control terminal 65 coupled with the local bus, an ordinary terminal (A) 66, and another ordinary terminal (B) 67. The control terminal 65 has not only the layers 1 through 3 (65a, 65b, 65c), but also the function 65d (layer 3) for each ordinary terminal, a global control 65e for controlling an ordinary terminal coupled with a local bus, and a communication part 65f for sending/receiving a terminal control signal by using the layers 1 and 2 (65b and 65c). An ordinary terminal has not only the layers 1 and 2 (66a, and 66b), but also a communication part 66c for sending/ receiving a terminal control signal by using the layers 1 and 2, and the local control 66d for controlling the own terminal based upon said terminal control signal. However, layer 3 function is not included.

It is assumed that the control terminal 65 has the ordinary terminal (A) 66 send a kind of signal (e.g. communication signal). The global control 65e of the control terminal sends a command 65A to the layer 3 (65d) for the ordinary terminal A in the control terminal. Upon receipt of the call control signal 65B, and after the completion of the establishment of a call by the layer 3 (65d), the global control 65e of the control terminal sends the start command 65C of sending/receiving user's communication signal on the B-channel. That terminal control signal 65C is inserted into the frame 65D which has the address of the terminal A, using the layer 2 in the communication part 65b, and is sent to the local bus 64 using the layer 1 (65c).

In the ordinary terminal A (66), the communication part 66c receives the frame 65D from the local bus 64 using the layer 1 (66b), takes the terminal control signal 66E in the frame using the layer 2 (66a), and sends the same to the local control. The local control interpretes the received terminal control signal as the start command of sending/receiving user's signal, and begins the same.

Figure 7:
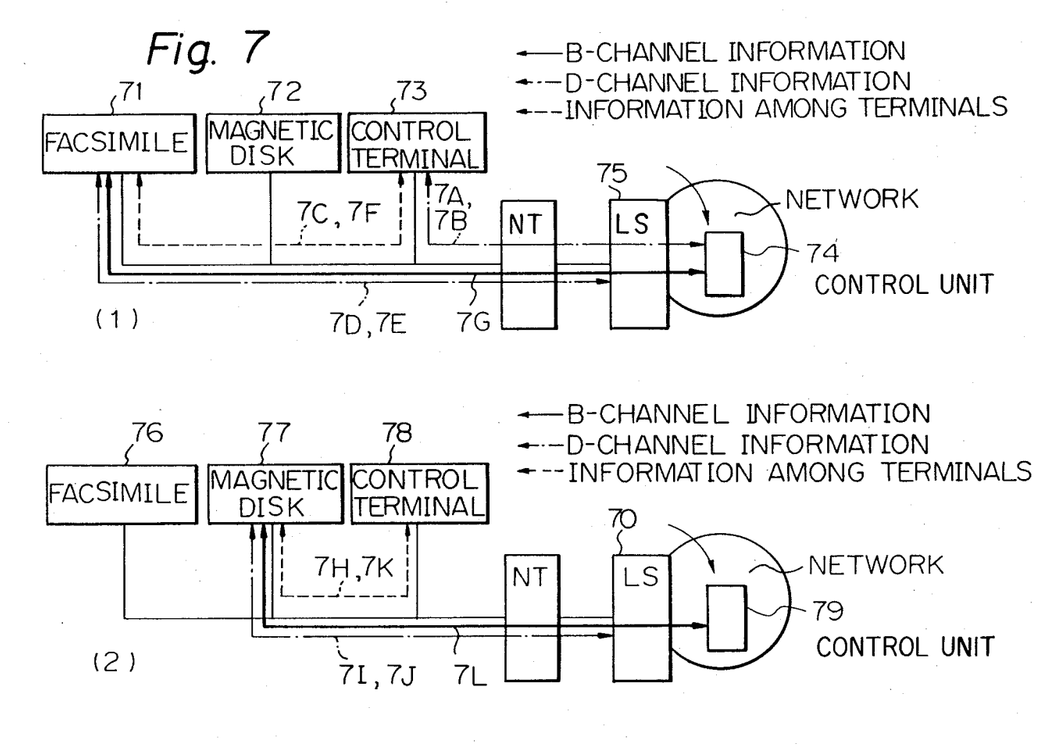
FIG. 7 is an explanatory drawing of an example that a control terminal controls an ordinary terminal by receiving information from a communication service support means in a network.

FIG. 7 shows another embodiment of the present invention, in which an information process support system like a data base and/or a message handling system in a network cooperates with the present system. Facsimile terminals 71 and 76, magnetic disk terminals 72 and 77, and the control terminals 73 and 78 participate a tele-conference. The control terminals send/receive the control signals to/from the tele-conference control units 74 and 79 in the network. The control terminals control the ordinary terminals basis on the control signal of the tele-conference control units.

An example is shown in FIG. 7. In this case, it is required that according to the change of the format of communication-signal the B-channel connected to the facsimile terminal must be connected to the magnetic disk terminal during a call.

The operation is as follows.

(1) The control terminal 73 informs the control unit 74 the changing of receiving terminal 7A, and upon receipt of the acknowledgement 7B, the control terminal sends the facsimile terminal 71 command for the interruption of the call 7C. The facsimile terminal 71 sends the call control signal for the call suspension 7D to the LS 75, and upon receipt of the call control signal for the acknowledgement 7E from the LS, the information 7F is sent to the control terminal 73 to respond the command for the interruption of the call. The facsimile terminal 71 stops the communication 7G through the B-channel.

(2) The control terminal 78 sends the command for the re-start of the call 7H to the magnetic disk terminal 77. The magnetic disk terminal 77 sends the LS 70 the call control signal for call resume 7I, and upon receipt of the call control signal for the acknowledgement 7J from the LS 70, that acknowledgement is passed to the control terminal 78 as the signal 7K to respond the command for the re-start of the call. The signal 7L to the magnetic disk 77 is transferred through the B-channel.

Finally, the particular effects of the present invention are described.

(1) A network termination unit returns or reflects a signal on D-channel from TE to NT which is sent to a subscriber line, so that the signal is sent not only to a subscriber exchange (LS), but also to terminal equipment in the same subscriber. The signal structured like the frame with a particular unregistered address even in a LS and is used for the communication among terminal equipment in the same subscriber. Thus, the communication within subscriber independent from a network is accomplished by using the same frame structure as that of prior art, and without any change of a network termination unit and/or a subscriber exchange.

(2) Various kinds of ISDN subscriber terminals are unitary controlled without using the particular fixed communication path and/or the structure and used effectively. Further, by using the information process support system installed in the network, a communication service enhanced higher than that of each subscriber terminal are provided.

From the foregoing, it will now be apparent that a new and improved ISDN subscriber terminal control system has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. ISDN subscriber terminal control system comprising:
   a subscriber line coupled with a subscriber location,
   a local bus installed in the subscriber location,
   a network termination unit for terminating and for connecting both said subscriber line and said local bus,
   a plurality of terminal equipment coupled with said local bus,
   plurality of two-way communication channels, said channel providing communication between any terminal equipment in said subscriber location with terminal equipment in another subscriber location,
   one of said communication channels being a control channel,
   another one of said communication channels being an echo channel which sends a copy of a control channel signal from said terminal equipment to said network termination unit, and said echo channel being from said network termination channel to said terminal equipment;
   a control terminal which is one of said terminal equipment, having a global control and communication parts,
   said control terminal being physically connected with said local bus, said control terminal communicates with said terminal equipment within said subscriber location without sending any significant signal to said subscriber line, said control terminal establishes and releases a local control phase among said plurality of terminal equipment, and said control terminal controlling ordinary terminal equipment communication with another subscriber location cooperatively by the transference of a terminal control signal between said control terminal and the ordinary terminal equipment, and
   said control terminal operates as an ordinary terminal equipment when it is not in a local contorl phase.

2. ISDN subscriber terminal control system according to claim 1, wherein a unnumbered information frame code which shows that a frame is not registered in a subscriber exchange is included in a frame.

3. ISDN subscriber terminal control system according to claim 1, wherein said terminal equipment include a facsimile terminal, a magnetic disk terminal, and a telephone terminal.

4. ISDN subscriber terminal control system according to claim 1, wherein said local control phase is established and released by said control terminal sending control signal to other terminal apparatuses through said local bus.

5. ISDN subscriber terminal control system comprising:
   a subscriber exchange;
   a subscriber line coupled to said subscriber exchange;
   a local bus;
   a network termination unit terminating and connecting said subscriber line and said local bus;
   a plurality of terminal equipment coupled with said local bus, one of said terminal equipment being a control terminal and the remaining terminal equipment being ordinary terminal equipment, said control terminal having a means for communicating with terminal equipment in another subscriber exchange, having a means for controlling said ordinary terminal equipment coupled with said local bus and having a means for transferring information for controlling ordinary terminal equipment using communication means in said terminal equipment without affecting said subscriber exchange, said control terminal establishing a local control phase when required and releasing said local control phase when local control is not required, said control terminal operating as an ordinary terminal equipment when not in said local control phase;
   a plurality of two-way communication channels, said communication channels providing communication between said plurality of terminal equipment with terminal equipment in another subscriber exchange, one of said communication channels being a control channel, another one of said communication channels being an echo channel which sends a copy of a control channel signal from said terminal equipment to said network termination unit, said echo channel being from said network termination unit to said terminal equipment.

6. ISDN subscriber terminal control system comprising:
   a subscriber line;

a local bus;

a network termination unit for terminating and for connecting said subscriber line to said local bus;

terminal equipment having a plurality of two-way communication channels including an echo channel which sends a copy of a control channel signal which is sent to said network termination unit, one of said terminal equipment being a control terminal for global control and for establishing and releasing local control, said control terminal communicating various signal information with said terminal equipment and with other subscriber exchanges using signaling on said subscriber line.

* * * * *